United States Patent [19]

Carman

[11] 4,350,220

[45] * Sep. 21, 1982

[54] AUTOMOTIVE DRIVE SYSTEM

[75] Inventor: Vincent E. Carman, Portland, Oreg.

[73] Assignee: Advanced Energy Systems Inc., Portland, Oreg.

[ * ] Notice: The portion of the term of this patent subsequent to Oct. 14, 1997, has been disclaimed.

[21] Appl. No.: 167,446

[22] Filed: Jul. 10, 1980

Related U.S. Application Data

[63] Continuation of Ser. No. 948,827, Oct. 5, 1978, Pat. No. 4,227,587, which is a continuation of Ser. No. 765,951, Feb. 7, 1977, abandoned.

[51] Int. Cl.$^3$ .............................................. B60K 9/00
[52] U.S. Cl. ..................................... 180/165; 60/414; 60/418; 180/305; 180/308
[58] Field of Search .................. 180/165, 65 C, 65 A, 180/65 R, 65 E, 307, 306, 305, 302, 308; 60/418, 414, 413; 290/13, 16, 17

[56] References Cited

U.S. PATENT DOCUMENTS

| | | | |
|---|---|---|---|
| 786,376 | 4/1905 | Nilson | 290/17 |
| 786,775 | 4/1905 | Nilson | 200/18 X |
| 1,380,795 | 6/1921 | Graziano et al. | 180/302 X |
| 1,790,635 | 1/1931 | Arendt | 290/17 |
| 1,831,071 | 11/1931 | Jones | 180/65 C X |
| 1,963,091 | 6/1934 | Jenkins | 180/302 |
| 3,665,788 | 5/1972 | Nyman | 180/165 X |
| 3,892,283 | 7/1975 | Johnson | 180/165 |
| 3,903,696 | 9/1975 | Carman | 180/165 X |
| 4,018,052 | 4/1977 | Laussermair | 60/414 |
| 4,037,409 | 7/1977 | Leibach | 60/413 |
| 4,064,694 | 12/1977 | Baudoin | 60/418 X |
| 4,098,144 | 7/1978 | Besel et al. | 60/413 X |
| 4,110,982 | 9/1978 | Regar | 60/413 |

FOREIGN PATENT DOCUMENTS

| | | |
|---|---|---|
| 2462058 | 4/1976 | Fed. Rep. of Germany . |
| 2462059 | 4/1976 | Fed. Rep. of Germany . |
| 2451021 | 5/1976 | Fed. Rep. of Germany . |
| 2454753 | 5/1976 | Fed. Rep. of Germany . |
| 2515048 | 10/1976 | Fed. Rep. of Germany . |
| 955604 | 4/1964 | United Kingdom ................ 180/307 |

OTHER PUBLICATIONS

Scott, International Viewpoints, *Automotive Engineering*, May 1976, pp. 18 and 19.
Beale, A Sterling-Hydrostatic Drive for Small Vehicles, *IECEC '75 Record*, pp. 958-960, #759143.
Dewey et al., Accumulator-Charged Hydrostatic Drive for Cars Saves Energy, *Hydraulics and Pneumatics*, Oct. 1974, pp. 180-183.
Elder et al., Simulation of a Hydraulic Hybrid Vehicle Power Train, *ASME Paper*, May 3, 1973.
Tartaglia, A Low Pollutant, High Energy Efficiency Hybrid Hydraulic Power Plant, *ASME Paper*, Apr. 10, 1973.
Mosbech, "Hybrid Vehicles", pp. 2-16, Jul. 29, 1980.

*Primary Examiner*—Richard A. Bertsch
*Assistant Examiner*—Milton L. Smith
*Attorney, Agent, or Firm*—Chernoff & Vilhauer

[57] ABSTRACT

An internal combustion engine is connected to a fixed displacement pump normally having its inlet connected to a reservoir and its outlet connected to an accumulator. To start the engine, selectively operable valves connect the inlet of the pump to the accumulator and the outlet to the reservoir to drive the pump as a motor to rotate the engine. Also, a fixed displacement motor has an inlet connected by a forward solenoid valve to the accumulator and pump and connected by a brake solenoid valve to the reservoir. The motor also has an outlet connected to the pump and the accumulator by a reverse solenoid valve and connected to the reservoir by a neutral solenoid valve.

3 Claims, 4 Drawing Figures

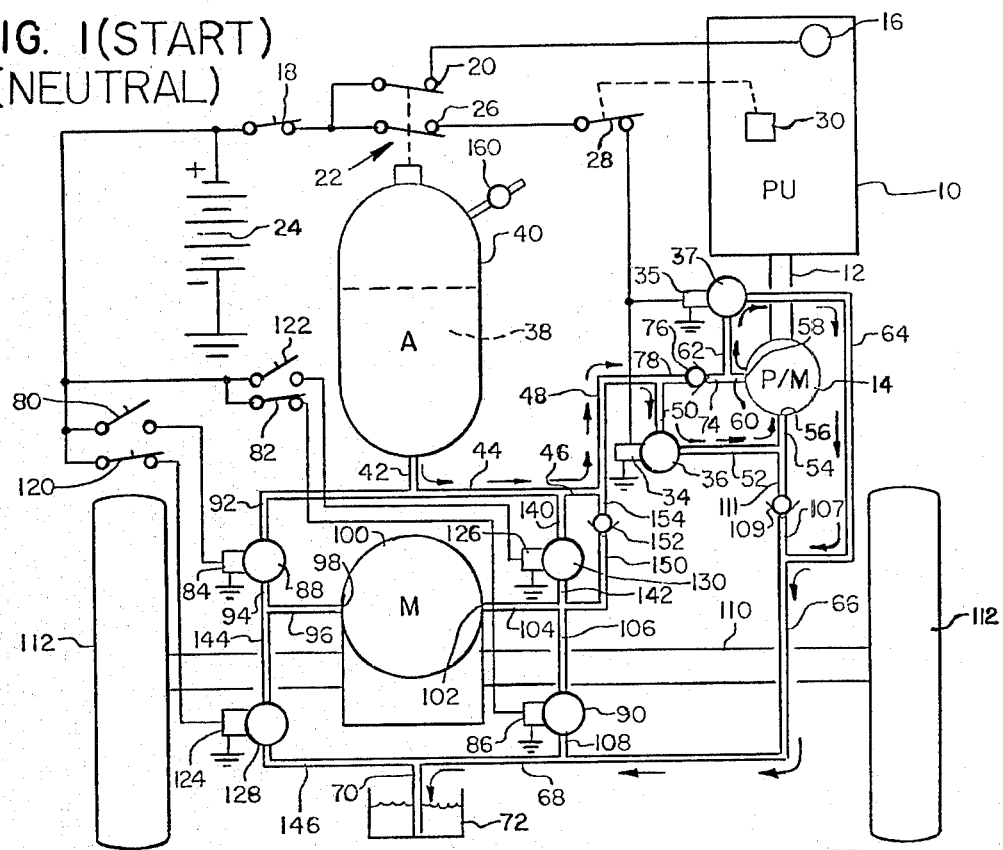
FIG. 1 (START) (NEUTRAL)
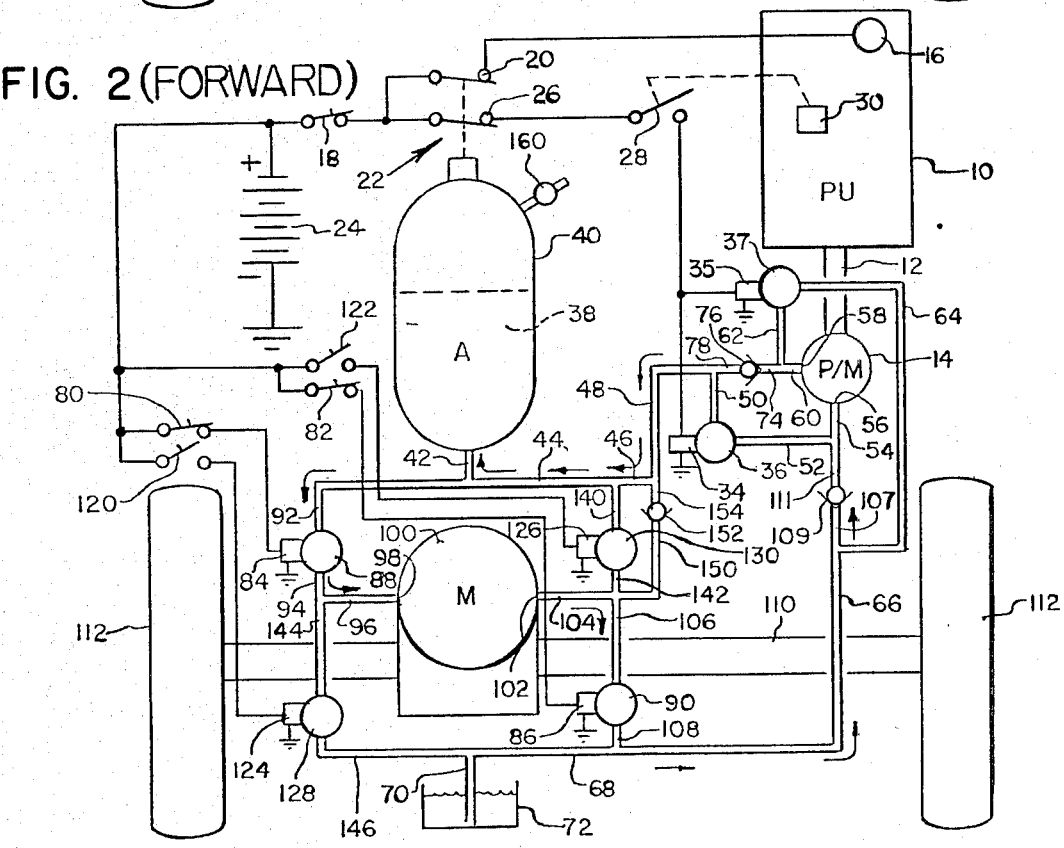
FIG. 2 (FORWARD)

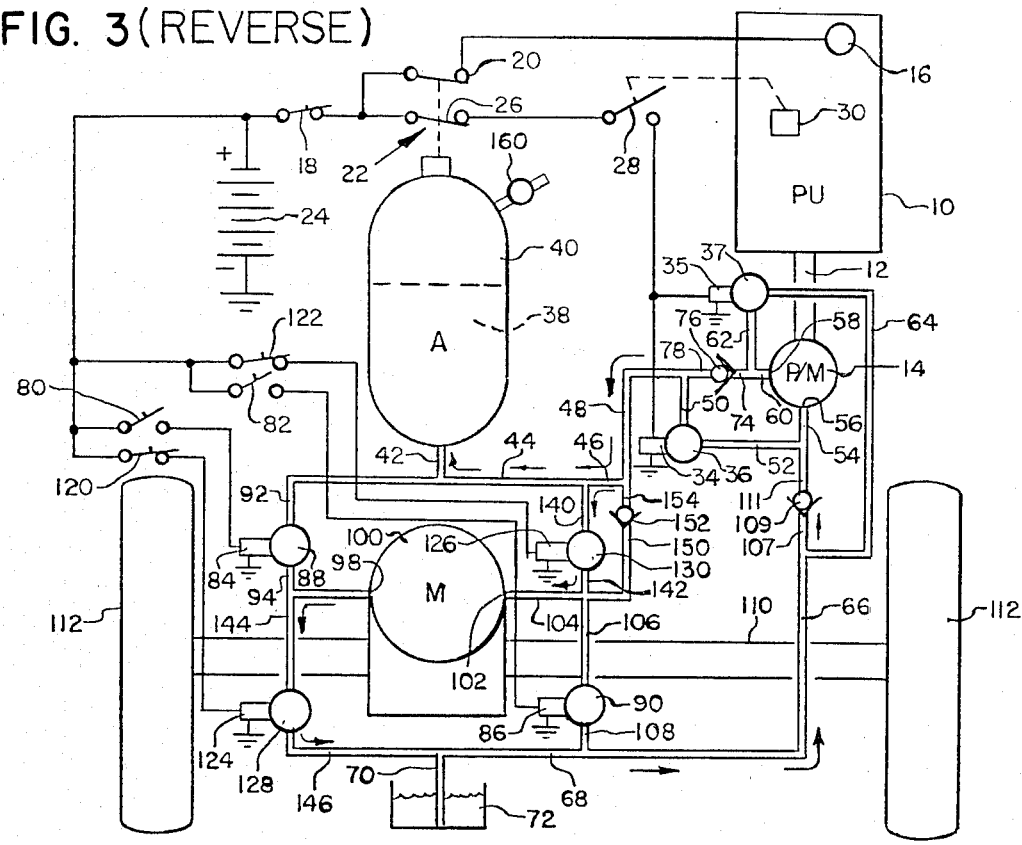

AUTOMOTIVE DRIVE SYSTEM

This is a continuation of application Ser. No. 948,827, filed Oct. 5, 1978, now U.S. Pat. No. 4,227,587, issued Oct. 14, 1980, which in turn is a continuation of application Ser. No. 765,951, filed Feb. 7, 1977, now abandoned.

DESCRIPTION

This invention relates to an improved automotive drive system and has for an object thereof the provision of a new and improved automotive drive system.

Another object of the invention is to provide an automotive drive system including an internal combustion engine, a pump connected mechanically to the engine and an accumulator normally supplied with liquid under pressure from the pump and adapted to be selectively connected to the inlet of the pump to drive the pump as a motor to start the engine.

A further object of the invention is to provide an automotive drive system including an accumulator, a pump normally driven by an internal combustion engine and adapted to be driven as a motor to start the engine, and a motor adapted to be selectively driven in forward or reverse by the accumulator and the pump, to be driven by wheels to act as a pump and to be connected in a neutral condition to a reservoir.

Another object of the invention is to provide an automotive drive system including a source of hydraulic liquid under pressure and a fixed displacement motor adapted to be selectively connected to the source and a reservoir in forward, reverse, braking or neutral.

In the drawings:

FIG. 1 is a schematic view of an improved automotive drive system forming one embodiment of the invention with a drive pump thereof being used as a starter motor and a drive motor in a neutral condition;

FIG. 2 is a schematic view of the automotive drive system of FIG. 1 in a forward drive condition and drive pump connected as a pump;

FIG. 3 is a schematic view of the automotive drive system of FIG. 1 in a reverse drive condition and drive pump connected as a pump;

FIG. 4 is a schematic view of the automotive drive system of FIG. 1 in a braking condition and drive pump connected as a pump.

An improved automotive drive system forming one specific embodiment of the invention includes a prime mover in the form of an internal combustion engine 10, which is set to operate at its most efficient engine speed. Usually, this is slightly over one-half the maximum rated RPM. When the vehicle speed reaches approximately one-half the maximum speed of the vehicle, or extra rapid acceleration is needed, the engine 10 will operate at a higher speed. Such speed will be determined by the position of a foot throttle (not shown). The engine has a drive shaft 12 mechanically connected to a fixed displacement hydraulic pump 14 which also can operate as a fixed displacement hydraulic motor. The engine has an ignition circuit 16 activated when a key operated switch 18 and contacts 20 of a pressure responsive switch 22 are closed to connect it to a battery 24. Contacts 26 of the switch 22 are connected in series with normally closed contacts 28 which are opened, when the engine reaches a minimum operating speed, by a known speed responsive device 30 driven by the engine.

The fixed displacement pump 14 also serves as a fixed displacement motor to rotate the engine 10 to start the engine. To start the engine, switches 18, 82 and 120 are closed by the driver, the system being in its neutral condition as is shown in FIG. 1. The contacts 28 are closed since the engine is not running so that solenoids 34 and 35 are energized to open valves 36 and 37. It is assumed that pressure on hydraulic liquid 38 in an accumulator 40 is lower than the desired minimum operating pressure of, for example, 1700 pounds per square inch. The switch 22 is set to energize whenever the pressure drops below a predetermined level, for example, 2,000 PSI, whereby contacts 26 close and current flows through closed contacts 28 and opens valves 36 and 37 by energizing solenoids. 34 and 35. The liquid flows from the accumulator 40 through lines 42, 44, 46, 48 and 50, the valve 36 and lines 52 and 54 to port 56 of the pump 14, through the pump 14 (to drive it as a motor), out port 58 of the pump, through lines 60 and 62 of the valve 37 and lines 64, 66, 68 and 70 to a reservoir 72. This drives the pump as a motor to turn the engine to start it. When it has started and reached a low level operating speed, the speed responsive device opens the switch 28. Opening of the switch 28 drops out the solenoids 34 and 35 and the valves 36 and 37 close. The pump 14 now acts as a pump to pump the liquid from the line 54 through lines 60 and 74, a check valve 76 and line 78 to the line 48. A fixed displacement hydraulic motor 100, which serves as the vehicle drive motor and also may operate as a pump, may or may not be turning depending on whether or not the vehicle is in motion when the engine start cycle occurs. If we assume that the vehicle is moving forward, and motor 100 rotating and valves 128 and 90 are both open, the motor will be in a neutral condition and oil from reservoir 72 will flow through valve 128, motor 100 and valve 90 back to the reservoir 72.

Motor 100 has two ports 98 and 102, respectively referred to as the inlet and outlet ports. The inlet port 98 of the motor 100 is connected by a "forward" solenoid valve 88 to the accumulator 40 and by a "brake" solenoid valve 128 to the reservoir 72. The outlet port 102 of the motor 100 is connected by a "reverse" solenoid valve 130 to the accumulator and by a "neutral" solenoid valve 90 to the reservoir.

To drive the automobile forward, the driver closes switch 80 preferably placing the system in the condition shown in FIG. 2, and opens switch 120. Closing the switch 80 causes energization of solenoid 84. Opening switch 120 de-energizes solenoid 124. Thus, valve 80 opens and valve 128 closes. The liquid 38 then is forced from the line 42 or 46 through line 92, the valve 88, lines 94 and 96; port 98 of motor 100; the motor 100; port 102 of the motor 100; lines 104 and 106; the valve 90, and line 108 to the line 66 leading to the pump through a line 107, a check valve 109 and lines 111 and 54 if the engine is running. If the engine is not running, the oil will flow through line 68 to the reservoir 72. The motor is connected to drive axle 110 and drives drive wheels 112 of the automobile in a forward direction.

To drive the automobile in reverse, the driver places the system in the condition thereof shown in FIG. 3 by actuating a switch in the driving compartment and depressing the accelerator. The switches 80 and 82 are open and switches 120 and 122 are closed to energize solenoid windings 124 and 126 to open valves 128 and 130. The liquid 38 pumped from the pump 14 or flow from accumulator 40, then flows from the line 46 through line 140, the valve 130, lines 142 and 104, the motor 100, lines 96 and 144, the valve 128 and line 146.

To brake the automobile, the system is placed by the driver in the condition shown in FIG. 4, by removing his foot from the accelerator. The switch 120 is closed to cause the valve 128 to open. The motor 100 then acts as a pump to pump the liquid 38 from the line 146 through the valve 128, lines 144 and 96; the motor 100; lines 104 and 150; check valve 152 and lines 154, 44 and 42 to the accumulator 40.

To start the engine 10 under a condition in which there is insufficient pressure in the accumulator 40 to start the engine, the driver closes the switch 18 to open the valves 36 and 37 and closes the switch 120. The automobile then is pushed, or coasted downhill, and the motor 100 is in its pumping phase (braking) and pumps the liquid 38 through the valve 152 to the accumulator and the pump 14, which is thereby driven as a motor to turn over the engine and start it. Also, a handpump (not shown) could be used to pump oil from the reservoir into the accumulator.

An adjustable relief valve 160 is provided to prevent the pressure in the accumulator from exceeding a predetermined maximum, for example, 3,200 pounds per square inch. The pressure switch 22 is set to be closed to start the engine 10 whenever the pressure is less than a desired predetermined minimum, for example, 1,700 pounds per square inch. The switch 22 is set to open the contacts 20 and 26 at the upper limit of the desired operating ranges, for example, 2,800 pounds per square inch. The motor 100 then is driven by the accumulator 40 alone, without the engine 10, until the pressure goes below a lower limit of, for example, 1,700 pounds per square inch, the switch 22 then closing the contacts 20 and 26.

For starting, using the pump as a starter motor, the the engine 10 is turned over very rapidly as the starter motor is capable of providing as much horsepower as the engine. This rapid starting of the engine eliminates pollutants during the frequent stop/start cycle of the engine.

What is claimed is:

1. In a wheeled vehicle having an engine and a system for selectively storing energy normally lost in braking the vehicle and using said energy to drive the vehicle, a drive transmission and engine-starting system comprising:
   (a) a mechanical energy storage accumulator for collecting and storing mechanical energy;
   (b) a power transmission mechanically coupled to at least one wheel of said vehicle for driving and being driven by said wheel;
   (c) a transmission controller selectively mechanically connecting said power transmission to said energy storage accumulator for causing said power transmission to deliver mechanical energy to said storage accumulator for storage therein in response to the driving of said power transmission by said wheel to brake said vehicle;
   (d) a transmission controller selectively mechanically connecting said power transmission to said energy storage accumulator for causing said power transmission to receive mechanical energy from said storage accumulator to drive said wheel;
   (e) said engine being mechanically coupled to said energy storage accumulator for delivering mechanical energy from said engine to said storage accumulator for storage therein;
   (f) an energy sensor connected to said energy storage accumulator for sensing the amount of mechanical energy stored therein;
   (g) an engine stop-start controller connected responsively to said energy sensor and connected to said engine for stopping said engine when the amount of energy in said energy storage accumulator exceeds a predetermined maximum and for starting said engine in response to a drop in the energy in said storage accumulator below a predetermined minimum; and
   (h) means automatically responsive to the starting of said engine for selectively preventing the delivery of mechanical energy from said engine to said storage accumulator during said starting of said engine and permitting said delivery after said starting of said engine.

2. The drive transmission and engine-starting system of claim 1 wherein said engine stop-start controller includes a selectively-actuated starter motor connected to said engine for driving said engine, said starter motor being connected to said energy storage accumulator for receiving mechanical energy therefrom to drive said engine, said engine stop-start controller further including an actuator for actuating said starter motor to drive said engine in response to a drop in the energy in said storage accumulator below a predetermined minimum.

3. The drive transmission and engine-starting system of claim 1 wherein said engine is of the internal combustion type and said engine stop-start controller includes a selectively-actuated starter motor connected to said engine for driving said engine.

* * * * *

UNITED STATES PATENT AND TRADEMARK OFFICE
CERTIFICATE OF CORRECTION

PATENT NO. : 4,350,220
DATED : September 21, 1982
INVENTOR(S) : Vincent E. Carman It is certified that error appears in the above-identified patent and that said Letters Patent are hereby corrected as shown below:

Col. 2, line 15  After "solenoids" delete the period (.);

line 50  Change "80" to --88--.

Signed and Sealed this

Seventh Day of December 1982

[SEAL]

Attest:

Attesting Officer

GERALD J. MOSSINGHOFF
Commissioner of Patents and Trademarks